(12) United States Patent
Kephart et al.

(10) Patent No.: US 11,442,991 B2
(45) Date of Patent: Sep. 13, 2022

(54) USING NATURAL LANGUAGE TO CONTROL STRUCTURED WEB PAGE DATA

(71) Applicants: INTERNATIONAL BUSINESS MACHINES CORPORATION, Armonk, NY (US); RENSSELAER POLYTECHNIC INSTITUTE, Troy, NY (US)

(72) Inventors: Jeffrey Owen Kephart, Cortlandt Manor, NY (US); Hui Su, West Roxbury, MA (US); Matthew Peveler, Troy, NY (US)

(73) Assignees: INTERNATIONAL BUSINESS MACHINES CORPORATION, Armonk, NY (US); RENSSELAER POLYTECHNIC INSTITUTE, Troy, NY (US)

( * ) Notice: Subject to any disclaimer, the term of this patent is extended or adjusted under 35 U.S.C. 154(b) by 216 days.

(21) Appl. No.: 16/520,929

(22) Filed: Jul. 24, 2019

(65) Prior Publication Data

US 2020/0097506 A1  Mar. 26, 2020

Related U.S. Application Data

(60) Provisional application No. 62/734,559, filed on Sep. 21, 2018.

(51) Int. Cl.
*G06F 16/9032* (2019.01)
*G06F 16/9532* (2019.01)
(Continued)

(52) U.S. Cl.
CPC ........ *G06F 16/90332* (2019.01); *G06F 3/167* (2013.01); *G06F 16/954* (2019.01); *G06F 16/9532* (2019.01); *G06F 40/30* (2020.01)

(58) Field of Classification Search
CPC ........... G06F 16/90332; G06F 16/9532; G06F 16/954; G06F 40/30; G06F 3/167
(Continued)

(56) References Cited

U.S. PATENT DOCUMENTS 7,146,323 B2  12/2006  Guenther
8,065,667 B2 *  11/2011  Kellogg ............. G06F 9/45529
                                                   717/139
(Continued)

OTHER PUBLICATIONS

Anonymous, "Azure Monitor overview," Microsoft Docs, Oct. 24, 2021, 9 pages.
(Continued)

*Primary Examiner* — Sherrod L Keaton
(74) *Attorney, Agent, or Firm* — Cantor Colburn LLC; Stosch Sabo (57) ABSTRACT

A computer-implemented method for multi-modal interaction with structured web page data includes automatically injecting event monitoring code into a web page. One or more event streams generated by the injected event monitoring code are received. A request to perform an operation on data displayed on the web page is received from a user. A command is generated that has one or more parameters based at least in part on one or more mappings between the received request and the received one or more event streams. The command to fulfil the received request is executed by interacting with the web page.

20 Claims, 4 Drawing Sheets

(51) Int. Cl.
  *G06F 16/954* (2019.01)
  *G06F 3/16* (2006.01)
  *G06F 40/30* (2020.01)
(58) Field of Classification Search
  USPC .......................................................... 704/275
  See application file for complete search history.

(56) References Cited

U.S. PATENT DOCUMENTS

| | | |
|---|---|---|
| 8,825,628 B2 | 9/2014 | Feng |
| 9,940,396 B1* | 4/2018 | Willhoit .................. G06F 3/167 |
| 2002/0062216 A1* | 5/2002 | Guenther ................ G06F 3/167 |
| | | 704/270.1 |
| 2008/0235671 A1* | 9/2008 | Kellogg .............. G06F 9/45529 |
| | | 717/139 |
| 2010/0077295 A1* | 3/2010 | Ichino ................... G06F 40/137 |
| | | 715/235 |
| 2013/0054509 A1* | 2/2013 | Kass ...................... G06Q 10/00 |
| | | 715/753 |
| 2014/0040746 A1* | 2/2014 | Reich ..................... G06F 3/167 |
| | | 715/728 |

OTHER PUBLICATIONS

Farrell et al., "Symbiotic Cognitive Computing," Associationg for the Advancement of Artificial Intelligence, ISSN 0738-4602, 2016, pp. 81-93.

Iyer, "Mozilla is working on a voice-controlled web browser 'Scout'," Techworm, Jun. 19, 2018, 2 pages.

Kephart et al., "A Cognitive Assistant for Visualizing and Analyzing Exoplanets," Association for the Advancement of Artificial Intelligence, 2018, 2 pages.

* cited by examiner

FIG. 1

Team X Squad

English Premier League ⌄   2017-18 ⌄

Goalkeepers

| NO | NAME | AGE | APP | SUBIN | S | GC | A | FC | FA | YC | RC |
|---|---|---|---|---|---|---|---|---|---|---|---|
| 1 | Player 1 | 36 | 3 | 0 | 7 | 4 | 0 | 0 | 0 | 0 | 0 |
| 13 | Player 13 | 26 | 35 | 0 | 76 | 34 | 0 | 2 | 3 | 2 | 0 |
| 37 | Player 37 | 36 | 0 | 0 | 0 | 0 | 0 | 0 | 0 | 0 | 0 |

Outfield Players

| NO | NAME | AGE | APP | SUBIN | G | A | SH | ST | FC | FA | YC | RC |
|---|---|---|---|---|---|---|---|---|---|---|---|---|
| 2 | Player 2 | 25 | 27 | 2 | 2 | 1 | 15 | 4 | 26 | 14 | 4 | 0 |
| 3 | Player 3 | 27 | 33 | 0 | 7 | 2 | 65 | 23 | 26 | 31 | 6 | 0 |
| 24 | Player 24 | 32 | 27 | 3 | 0 | 0 | 10 | 3 | 17 | 17 | 1 | 1 |
| 27 | Player 27 | 22 | 27 | 4 | 0 | 0 | 12 | 1 | 8 | 13 | 0 | 0 |
| 28 | Player 28 | 29 | 37 | 0 | 2 | 6 | 13 | 3 | 25 | 13 | 1 | 0 |
| 30 | Player 30 | 31 | 10 | 1 | 1 | 0 | 11 | 4 | 12 | 15 | 4 | 1 |
| 31 | Player 31 | 20 | 0 | 0 | 0 | 0 | 0 | 0 | 0 | 0 | 0 | 0 |
| 33 | Player 33 | 24 | 5 | 2 | 0 | 1 | 2 | 2 | 3 | 5 | 0 | 0 |
| 50 | Player 50 | 19 | 0 | 0 | 0 | 0 | 0 | 0 | 0 | 0 | 0 | 0 |
| 66 | Player 66 | 18 | 0 | 0 | 0 | 0 | 0 | 0 | 0 | 0 | 0 | 0 |
| 4 | Player 4 | 31 | 32 | 7 | 2 | 4 | 38 | 10 | 25 | 22 | 4 | 1 |
| 6 | Player 6 | 28 | 12 | 7 | 1 | 0 | 6 | 2 | 10 | 4 | 0 | 0 |
| 7 | Player 7 | 27 | 34 | 0 | 1 | 1 | 25 | 5 | 41 | 15 | 3 | 0 |

FIG. 2A

| APPEARANCES | SUBIN | ▮ | ASSISTS | SH | SHOTS TARGET |
|---|---|---|---|---|---|
| 37 | 0 | 2 | 6 | 13 | 30 |
| 36 | 16 | 6 | 7 | 54 | 25 |

USING NATURAL LANGUAGE TO CONTROL STRUCTURED WEB PAGE DATA

BACKGROUND

The present invention relates to networked programmable computers and, more specifically, computer systems, computer-implemented methods, and computer program products configured to use natural language to control structured web pages.

There are a number of possible applications of hypertext-based systems wherein the traditional manner of inputting instructions or of activating links is considered to be disturbing, undesirable, or even impossible. Such can be the case when the user is impeded, the user's hands are busy with managing other jobs, or when the ambient conditions forbid the employment of traditional input devices. Computers that recognize and respond to natural language communications (e.g., voice, written text, etc.) are available in such cases as a simple, natural type of input that assumes less expertise on the part of the user than other input means.

SUMMARY

Embodiments of the present invention are directed to a computer-implemented method for multi-modal interaction with structured web page data. A non-limiting example of the computer-implemented method includes automatically injecting, using a processor, event monitoring code into a web page. One or more event streams generated by the injected event monitoring code are received. A request to perform an operation on data displayed on the web page is received from a user. A command is generated that has one or more parameters based at least in part on one or more mappings between the received request and the received one or more event streams. The command to fulfil the received request is executed by interacting with the web page.

Embodiments of the present invention are directed to a system for multi-modal interaction with structured web page data. A non-limiting example of the system includes a memory having computer-readable instructions and one or more processors for executing the computer-readable instructions. The computer-readable instructions include instructions for automatically injecting event monitoring code into a web page. One or more event streams generated by the injected event monitoring code are received. A request to perform an operation on data displayed on the web page is received from a user. A command is generated that has one or more parameters based at least in part on one or more mappings between the received request and the received one or more event streams. The command to fulfil the received request is executed by interacting with the web page.

Embodiments of the invention are directed to a computer-program product for multi-modal interaction with structured web page data, the computer-program product including a computer-readable storage medium having program instructions embodied therewith. The program instructions are executable by a processor to cause the processor to perform a method. A non-limiting example of the method includes automatically injecting event monitoring code into a web page. One or more event streams generated by the injected event monitoring code are received. A request to perform an operation on data displayed on the web page is received from a user. A command is generated that has one or more parameters based at least in part on one or more mappings between the received request and the received one or more event streams. The command to fulfil the received request is executed by interacting with the web page.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two- or three-digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" is intended to include any integer number greater than or equal to one, i.e., one, two, three, four, etc. The terms "a plurality" is intended to include any integer number greater than or equal to two, i.e., two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

In this detailed description, various examples are given in the context of HTML, JavaScript, and web pages. However, embodiments of the invention are not limited to those contexts. For example, the file can be a SVG (Scalable Vector Graphics) document (instead of an HTML file) that includes code that is executed when the file is accessed and interpreted.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Throughout this specification, the term "platform" is intended to convey a combination of software and hardware components to provide multi-modal interaction with structured web page data. Examples of platforms include, but are not limited to, a hosted service executed over a plurality of servers, an application executed on a single computing device, and comparable systems. The term "server" generally refers to a computing device executing one or more software programs typically in a networked environment. More detail on these technologies and example operations is provided below.

The term "multi-modal interaction system" is used herein to describe a dialog system that supports a variety of modes of interaction between the system and the user. Such modes of interaction may include, but are not limited to, speech, keyboard, handwriting, gesture, facial expression, context, affect, etc. Thus, while a user may input data to the dialog system in more than one mode (e.g., speech, text, etc.), the system may output data to the user in more than one mode using more than one interface or channel (e.g., speaker, graphical user interface, etc.). Further, it is to be understood that while embodiments of this invention are illustratively described for multi-modal conversational applications, they can also be deployed for voice only interactions.

A computing device, as used herein, refers to a device comprising at least a memory and a processor that includes a desktop computer, a laptop computer, a tablet computer, a smart phone, a vehicle mount computer, or a wearable computer. A memory may be a removable or non-removable component of a computing device configured to store one or more instructions to be executed by one or more processors. A processor may be a component of a computing device coupled to a memory and configured to execute programs in conjunction with instructions stored by the memory. A file is any form of structured data that is associated with audio, video, or similar content. An operating system is a system configured to manage hardware and software components of a computing device that provides common services and applications. An integrated module is a component of an application or service that is integrated within the application or service such that the application or service is configured to execute the component. A computer-readable memory device is a physical computer-readable storage medium implemented via one or more of a volatile computer memory, a non-volatile memory, a hard drive, a flash drive, a floppy disk, or a compact disk, and comparable hardware media that includes instructions thereon to automatically save content to a location. A user experience—a visual display associated with an application or service through which a user interacts with the application or service. A user action refers to an interaction between a user and a user experience of an application or a user experience provided by a service that includes one of touch input, gesture input, voice command, eye tracking, gyroscopic input, pen input, mouse input, and keyboards input. An application programming interface (API) may be a set of routines, protocols, and tools for an application or service that enable the application or service to interact or communicate with one or more other applications and services managed by separate entities.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Integration of traditional, acoustic voice recognition systems, i.e. systems for recognizing spoken language, with hypertext systems, which are also known as "viewer" or "browser" systems, are opposed by technological difficulties. Chatbots for customer care and other tasks are becoming ubiquitous. Furthermore, various systems for handling voice commands increasingly get integrated with various systems to reflect voice inputs. Next-generation research prototypes of more sophisticated cognitive assistants can now be adapted to help various users with establishing higher-level cognitive performance tasks via extended multi-modal dialogs involving combinations of speech, pointing, and gesture. A key function of the latter class of cognitive assistant is to help users interact naturally with complex data, i.e. to visualize, query, filter, sort, analyze, and otherwise manipulate it. However, it is labor-intensive to create specially-designed and specially-instrumented web pages for each cognitive app.

Turning now to an overview of technologies that are more specifically relevant to aspects of the invention, as previously noted, at least some cognitive assistants can fuse speech and pointing to determine user intent, such as, modifying the visualization, drilling down on data, performing calculations, etc. Such cognitive assistants can accomplish this fusion by reading data from a database and displaying data as specially-designed web pages. However, it is labor-intensive to create dynamically evolving specially-designed and specially-instrumented web sites for each cognitive app.

Turning now to an overview of aspects of the invention, embodiments of the present invention provide computer systems and related methods configured to enable multi-modal interaction with web pages that avoids the need for special instrumentation. The disclosed embodiments enable interaction with and manipulation of externally-curated electronic data residing on externally-developed web pages without requiring any domain-specific code.

In one approach, a tool is provided that injects executable code (e.g., JavaScript) into one or more locations within a file (e.g., a HTML file) to create a code-injected file. The code that is injected in this manner is code designed to monitor various events and is therefore referred to herein as "event-monitoring" code. The code-injected file is then executed using an interpreting engine. Information that is produced by executing the code-injected file is provided to the page analyzer for further processing. The tool used to inject the injected code can be, for example, a plug-in that is provided to an existing JavaScript interpreting engine, such as V8, SpiderMonkey, and JavaScriptCore.

Figure 1:
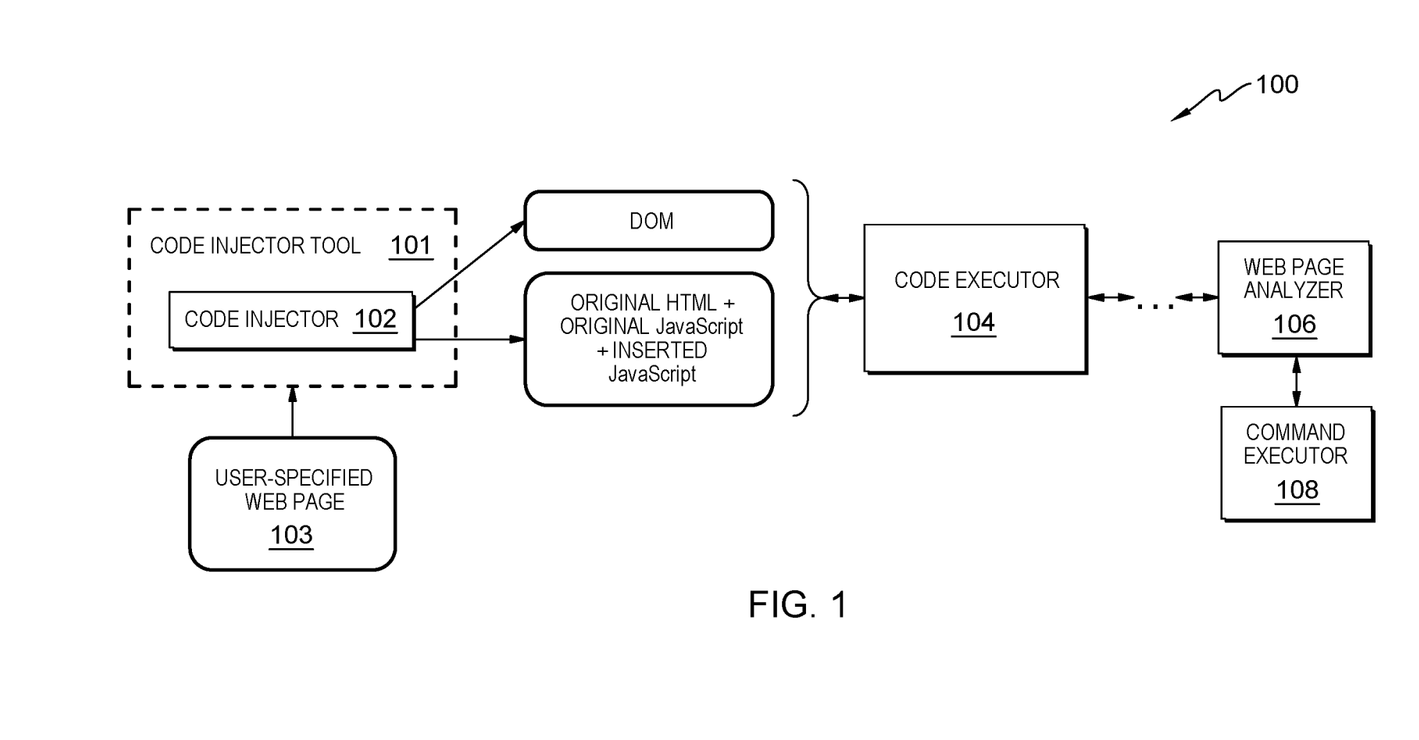
FIG. 1 is an example web page processing environment that includes a code injector for inserting code into a file, according to an embodiment of the invention.

FIG. 1 is an example web page processing environment 100 that includes a code injector for inserting code into a file, according to an embodiment of the invention. A code injector tool 101 includes a code injector 102 configured and operable to automatically inject event monitoring code into a web page when it is first displayed. According to one embodiment, the code injector tool 101 can use Electron framework, an open-source technology for building desktop applications using web architecture technologies.

The code injector tool 101 can also allow a user to specify a web page 103 containing data of interest with which they wish to interact. In one embodiment, the code injector tool 101 generates a Document Object Model ("DOM") from the content of the user-specified web page 103. The code injector tool 101 then cooperates with the Electron framework to generate a universally unique identifier (UUID) for a webview under Electron framework that will contain the web page contents based on the DOM.

A file that existed prior to the insertion of executable code is referred to as an "original file". A file that contains injected code that has been injected by the code injector 102 is referred to hereinafter as a "code-injected file."

In the illustrated embodiment, the code injector 102 accepts as input one or more original files, each of which can include JavaScript code and/or other executable code. Executable code that is contained in a file prior to the code injector 102 inserting injected code is referred to hereinafter as "original executable code".

The code injector 102 also uses Electron to pre-load an original JavaScript event-monitoring file on top of the webview accepts as input the injected code, at which to insert the injected code. In the context of an HTML file, the Electron framework fires DOM-ready event, whereupon the general event-monitoring code starts to execute by code executor 104.

Because executable code, such as JavaScript code, is typically executed in sequence (i.e., the first block of code is executed, followed by the second block of code, etc.) the locations in which to insert injected code are important. In one embodiment, during execution of the file, the code injector 102 detects specific DOM elements within the user-specified page 103 and injects numerous implementation-specific event-monitoring codes tailored to the detected DOM element. Such DOM elements may include, but are not limited to, table tags, js-plotly plot for a plot page created by plotly (open-source JavaScript charting library), and the like. In one embodiment, the code injector 102 injects the event-monitoring codes with appropriate bindings and individual UUIDs to distinguish them from one another.

The code executor 104 accepts as input the generated DOM and the code-injected file. The code executor 104 executes the original executable code and the injected code to generate content, some of which may not be in the original file, including any event-monitoring codes. Once the code executor 104 has executed the code contained in the code-injected page, the code executor 104 sends all, or a portion, of the generated content to another page analyzer for further processing. The generated content may be tagged to assist the subsequent page analyzer in distinguishing between original-code-produced content and injected event-monitoring codes.

Because the code executor 104 can function as an execution engine within a browser, the code executor 104 can output certain information regardless of the presence of injected code. For example, the original executable code is executed to generate any links to graphical images, links to video content that is time-delayed, and links to redirect pages. The links can be output by the code executor 104 regardless of whether there are any injected event-monitoring codes.

In one embodiment, the code executor 104 provides at least a portion of the code-produced content, as well as the original file, to a subsequent page analyzer (e.g., voice-controlled web page analyzer 106). The combination of the original file and the injected event-monitoring codes that is provided to the subsequent page analyzer is referred to as an "augmented file." Although the illustrated embodiment shows the code executor 104 separate from the code injector tool 101, in another embodiment, the code injector tool 101 includes the code executor 104.

In various embodiments, the web page analyzer 106 acts as one or more of a content extractor, a content analyzer, a content transformer, a content filter, etc.

The code injector tool 101 can be software that is installed and executed on the user's computer. In another embodiment, the code injector tool 101 is provided to a user through a Web interface so that the user does not have to install or configure any software. In this hosted solution approach, a form may be provided to a user that allows the user to specify the web page 103 with which they wish to interact.

Code within the code-injected file can be executed in the same manner as original code, without requiring any modification to the code executor 104. The content of the page produced by interpreting the code-injected file is referred to herein as "generated content." When interpreting the code-injected file to produce the generated content, both the injected code and any remaining original code are executed. Consequently, the generated content may include both injected event monitoring code and original-code produced content.

One reason for providing a tool to insert event monitoring codes into a file is to facilitate multi-modal interaction with web page data. Such multi-modal interaction allows the system to automatically derive semantic linkages and associations between web page structured data and human-friendly terms by which the user might refer to elements in the web-page. With the disclosed embodiments, individual end-users are able to create multiple personalized searches performed using a plurality of modes of interaction.

An example of how the disclosed system can be used in the context of a sports web page shall be given hereafter. In one embodiment, the disclosed system can extract information of interest from the generated content. Such user-specific information that is extracted from the generated content is referred to hereinafter as "extracted content." Extracted content can include text, graphics, images, links, etc. The extracted content can be a relatively small subset of the generated content.

The extracted content can include information that would not have been in the original page content. Such information is referred to hereinafter as "new content." New content can include text, graphics, images, links, etc. New content is produced as a result of changes made to the original file, which may include but is not limited to (1) the injection of injected code, and (2) modifications to original executable code.

Additionally or alternatively, the user can seek to modify content that would be contained in a rendered page by removing information that is extraneous. In that case, the injected code modifies the execution of original executable code that would otherwise generate information that is not contained in the original file. Therefore, "inserting" injected code can include modifying original executable code. Such extraneous information is referred to hereinafter as "extraneous content." An example of extraneous content is average/maximum/minimum values of a column or combination of columns that are computed across multiple tables. Additionally, or alternatively, the user can seek to modify content that would be contained in a rendered page by modifying the headers included in the original executable code to more human-friendly versions, for example.

According to an embodiment, a file-specific JavaScript DOM is generated to facilitate obtaining extracted content, new content, and modified content, and suppressing the generation of extraneous content. A DOM is a description of how an HTML or XML document is represented in a tree structure. A DOM provides a structure that facilitates access to the elements of an HTML or XML, document by scripting languages with object oriented features (e.g., JavaScript). Therefore, a DOM allows elements of structured documents to be accessed more easily.

In addition to the file-specific DOM, a DOM that is common to all web pages can be generated. Such a DOM includes interfaces to the Window, Navigator, Screen, History, and Locations objects. The Window object is the top level object in the JavaScript hierarchy and represents a browser window. The Navigator object contains information about the client browser. The Screen object contains information about the client's display screen. The History object consists of an array of URLs that the user has visited within a browser window. The Location object contains information about the current URL and is part of the Window object. The reference http://www.w3schools.com/js/js_htmldom.asp provides additional information on these objects that are common to all web pages.

The HTML file is parsed in order to generate the file-specific DOM, which is later added to the head of a file. The injected code is then tailored to various DOM elements of interest and are inserted into the original executable code to generate an augmented file.

When interpreting the code-injected file, all or a portion of the code blocks, including any injected code, are then executed. Any variables and context set from previously executed code blocks are carried forward to the next code block. If an error is encountered when executing the code in the code-injected file, then the execution process does not necessarily halt. Similar to some current Web browsers, all code blocks that are able to be executed can be executed regardless of the failure to execute a previous code block.

A DOM allows the system disclosed herein to monitor information regarding various events of interest and enable the disclosed system to detect any changes in the web page subsequent to the initial webview creation and reinitiate injection of code by the code injector 102, if necessary, to ensure that all relevant DOM elements remain instrumented. There are many other properties and methods that can be accessed through the file-specific DOM. The reference http://www.w3schools.com/js/js_examples.asp provides additional information regarding how JavaScript can be used to access the DOM of a file.

In various embodiments, the injected code may, when executed, obtain information related to a plurality of user events. User events can include, without limitation, mouse clicks, mouse overs, checking a box, selecting an option in a menu, selecting a radio button, filling out and submitting forms, and selecting a "play" button. Not only can the disclosed system extract useful information from a rendered webpage (including new content based on the monitored user events), in one embodiment the code injector tool 101 allows a user to modify the original text of the file and/or DOM structure. For example, injected code can remove noisy parts of the rendered page, thus helping to improve the precision of extracted content, including new content. Also, a modified web page can be rendered using synthesized speech rather than JavaScript alone.

Figure 2A:
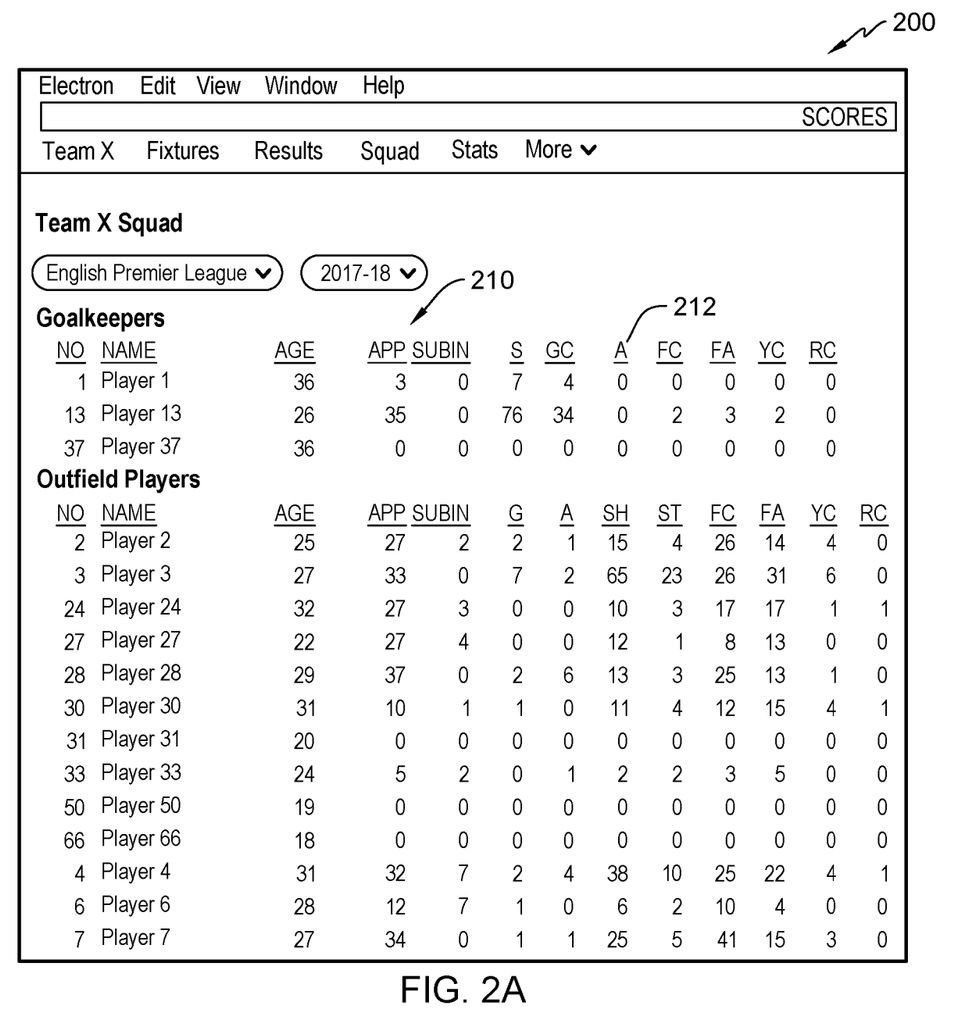
FIG. 2A depicts a diagram illustrating an example implementation of voice-controlled interactions with structured web page data, in accordance with embodiments of the present invention.
Figure 2B:
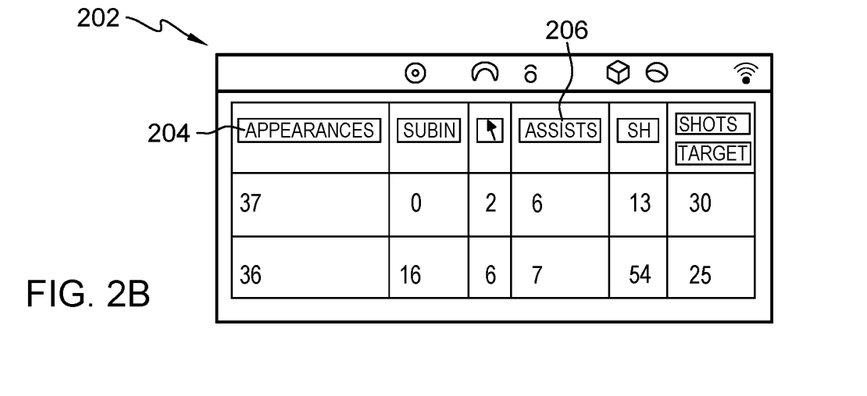
FIG. 2B depicts a diagram illustrating an example implementation of voice-controlled interactions with structured web page data, in accordance with embodiments of the present invention.

FIGS. 2A-2B are diagrams illustrating example implementations of voice-controlled interactions with structured web page data, in accordance with embodiments of the present invention. More specifically, FIG. 2A illustrates an embodiment in which the code injector tool 101 utilizes the Electron framework to generate a web page 200 where a user can compare statistics of soccer team players. The web page 200 is instrumented for user event monitoring. The presented content can be altered via code injections by the code injector tool 101. For example, the presented rows and/or columns can be changed, sorted or deleted by a user via one or more voice commands.

FIG. 2B illustrates an embodiment in which a new web page is generated by the web page analyzer 106. In this embodiment, a second web page 202 is created and rendered in response to user's request to extract data with appearances greater than 35 from the first (original) web page 200. The second web page 202 can be generated by the web page analyzer 106 based on searching of the structured data associated with the first web page 200. In other words, the user can issue the following voice command while reviewing data rendered by the first web page 200: "Save the rows where appearances is greater than 35 into a new table." It should be noted, the second page 202 optionally includes human-friendly column headings. For example, the column heading "appearances" 204 in the table of the second web page 202 can replace the column heading "app" 210 in the table of the first web page 200 and the column heading "assists" 206 in the table of the second web page 202 can replace the column heading "a" 212 in the table of the first web page 200. In one embodiment, the web page analyzer 106 can request mappings from available event tags to human-friendly labels, when the web page analyzer 106 is unable to infer the human-friendly labels automatically. For example, the web page analyzer 106 can ask the user the following: "I do not recognize all of these columns. Could you please mouse over columns 6, 8 and say what they are?" In one embodiment, the second web page 202 is also instrumented for user event monitoring by the code injector tool 101.

Figure 3:
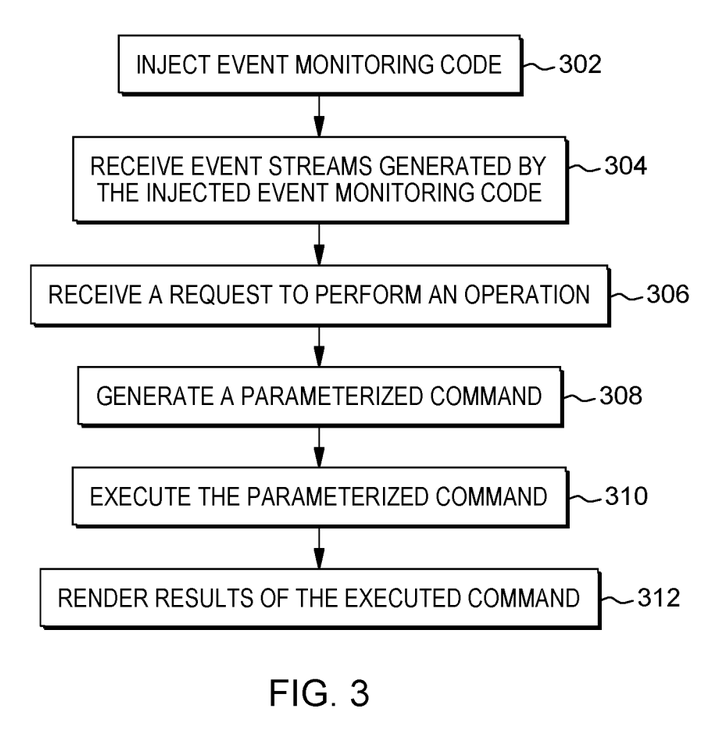
FIG. 3 shows a flow diagram of a method for multi-modal interaction with structured web page data, in accordance with embodiments of the present invention.

FIG. 3 is a flow diagram of a method for multi-modal interaction with structured web page data, in accordance with embodiments of the present invention. At block 302, the code injector tool 101 is configured to automatically inject event monitoring codes into a web page (e.g., first web page 200 shown in FIG. 2A) as described above. In embodiments of the invention, the code injector tool 101 can use the Electron framework. Furthermore, at block 302, in the context of an HTML file, the Electron framework fires DOM-ready event, whereupon the general event monitoring code starts to execute by the code executor 104.

At block 304, once a user starts interacting with the rendered web page, the web page analyzer 106 is configured to start receiving event streams generated by the injected event monitoring code. As noted above, in one embodiment, the code injector 102 injects the event monitoring codes with appropriate bindings and individual UUIDs to distinguish them from one another. The injected event monitoring code monitors user events for DOM elements to which it is bound. In one embodiment, the injected event monitoring code captures information regarding the detected events that includes their UUID and that of the webview as a whole. To facilitate interchange of information between the various components of the disclosed system, the captured information is preferably stored in a data format that separates the data from the presentation. At the time of this writing, JavaScript Object Notation (JSON) is a popular, lightweight, data-interchange format that can be used to send the information captured by the injected event monitoring code. Thus, by way of example, the captured information can be stored as a JSON data. In other embodiments, a BSON (Binary JSON) data object can be used. Although the use of JSON or BSON data objects is described, it should be appreciated that in other embodiments, the captured information may be exchanged and/or stored in a variety of other suitable formats, whether now existing or later developed. The event monitoring code can send the captured information over a web socket to the web page analyzer 106. In addition, the injected event monitoring code can use a mutation observer script to detect any changes in the web page subsequent to the initial webview creation. In one embodiment, the code injector 102 can re-initiate code injection when necessary to ensure that all relevant elements remain instrumented.

At block 306, the web page analyzer 106 is configured to receive a request from a user to perform an operation. Recent advances in natural language processing have enabled users to interact with aforementioned digital assistants using natural language, in spoken or textual forms, rather than employing a conventional user interface (e.g., menus or programmed commands). Similarly to such digital assistants, the web page analyzer 106 can be configured to interpret the user's input to infer the user's intent; translate the inferred intent into actionable tasks and parameters; execute operations or deploy services to perform the tasks; and produce output that is intelligible to the user. Ideally, the output produced by the web page analyzer 106 should fulfill the user's intent expressed during the natural language interaction between the user and the web page analyzer 106. In one embodiment, the request can be entered manually as a stream of text by the user via a conventional user interface. In an alternative embodiment, the received request may include a stream of text generated from an audio signal which includes spoken text via speech transcription user interface of the web page analyzer 106 capable of bi-directional communication. In one embodiment, the speech transcription user interface of the web page analyzer 106 can include a speech recognition and/or transcription engine (ASR), in communication with other components of the disclosed system. In one embodiment, the ASR engine receives the spoken request from the user, generates a transcribed stream of text, which can include a formatted transcription, and can transmit the transcribed request to the command executor 108, for example. In one embodiment, the ASR engine can have an ability to recognize and/or transcribe spoken text from any input source such as, for example, a live microphone or line input.

Responsive to receiving captured information regarding the detected events, at block 308, the web page analyzer 106 generates an inferred parameterized (or weight-based) command, the command parameters can factor in both the received and analyzed event streams (block 304) and the received user request (block 306). Optionally, in an embodiment of the present invention, the web page analyzer 106 may process semantic metadata imbedded in the web page to infer and/or convey semantic mappings which may be used to map from dictionary of terms used in users' speech/text commands to labels associated with the monitored events captured from the web page. In an alternative embodiment, user-supplied domain-specific semantic mappings can also be used by the web page analyzer 106 to map from dictionary of terms used in speech/text commands to labels associated with the monitored events captured from the web page.

More specifically, at block 308, the web page analyzer 106 receives the request to perform an operation and uses a command classifier to infer the command type (i.e., operation to be performed). Some examples of inferred command types may include but are not limited to user's requests to "show plot", "find data objects with given characteristics", "perform calculations", and the like. In one embodiment, the command classifier can be a component of the IBM Watson® system. The IBM Watson® system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure. In addition, the web page analyzer 106 can utilize an entity extractor (which can also be a component of the IBM Watson® system) to extract the entities from the received user's request.

In an embodiment of the present invention, the web page analyzer 106 performs complex command processing and generation. The web page analyzer 106 is capable of performing multiple step operations with a single spoken command phrase. Currently, user interfaces provide tooltips for on-screen labels that are truncated when a width of the text exceeds a pre-defined limit. In an embodiment of the present invention, at block 308, the web page analyzer 106 first identifies terms for which there is associated tooltip text data within the web page. Next, at runtime, the web page analyzer 106 further processes tooltip information. For each term with associated tooltip text, the web page analyzer 106 establishes a mapping between the term and the user interface element (e.g., tooltip text or a portion of the tooltip text that sufficiently matches the term). In one embodiment, generating the parameterized command includes generating functionality that establishes mappings in response to a user interaction. For example, as further described below, if in the context of text within the web page the character "W" appears in association with the tooltip text "Wins", the web page analyzer 106 establishes a mapping between "W" and "Wins".

In an embodiment of the present invention, the web page analyzer 106 attempts to combine the inferred command type, the extracted entities, and the original transcription of the received request to extract parameters associated with the desired operation/command. For example, if the user requested to perform the following operation—"Calculate luminosity for this star"—the web page analyzer 106 may infer that the command type is "calculate" and that the "calculate" command has 2 parameters: quantity ("luminosity") and object (<unspecified star>). Next, the web page analyzer 106 identifies any required parameters that are ill-specified in the received request (e.g., unspecified-star). After identifying the ill-specified parameters (if any), the web page analyzer 106 analyzes the most recent captured monitored events that could possibly be mapped to the ill-specified parameters. Upon receipt of the information related to the most recent captured monitored events, the web page analyzer 106 attempts to map the received monitored events to the ill-specified parameters in order to complete a fully-specified command. The fully-specified command may include both the command type and all required parameters. For example, the web page analyzer 106 can try to determine if the user pointed to or selected any star presented by the web page around the time of issuing the received request. If so, the web page analyzer 106 can infer that the selected object (star) represents the ill-specified parameter which would complete the fully-specified command. The inferred metadata can be augmented or enhanced, if desired, by known image recognition/classification techniques. Such technology seeks to provide automatic recognition of objects depicted in images. In one embodiment, the parameterized command can be represented as JSON/BSON data object. If the web page analyzer 106 successfully fills in all required parameters, the web page analyzer 106 sends the fully-specified command (e.g., as JSON/BSON data object) to the command executor module 108. If the web page analyzer 106 is unable to successfully fill in all required parameters, the web page analyzer 106 can either not accept the request received at block 306 or can prompt the user to provide any missing parameters. For example, the web page analyzer 106 can utilize its speech transcription user interface to ask user to provide the missing parameter: "I'm sorry—I didn't understand which star you intended. Please say its name or point to it." A user can enter the missing parameter information through input devices such as a keyboard and a pointing device such as a mouse. Other input devices can include a microphone, joystick, game pad, scanner, etc.

As noted above, generation of an inferred parameterized command from the single spoken command phrase and the streams of user events can involve a multiple step operation. The first step performed at block 308 may involve detecting the lack of one or more elements of domain knowledge required to satisfy a current or possible future user request (s). For example, user's command phrase may ask—"What is the average number of wins?", but the web page analyzer 106, after performing computational semantic content tagging and search may determine that it possesses no semantic mapping from a text or tag on the page (such as "W") to the notion of "wins". As another non-limiting example, the web page analyzer 106 can load a web page containing a table in which one of the headers is labeled "W", but the web page analyzer 106 might be unable to map the character "W" to any term in its current domain dictionary of terms with sufficient confidence and thus might be unprepared to answer questions involving the unknown term that maps to the character "W". The second step performed at block 308 can involve presenting to a user a textual and/or verbal (e.g., as synthesized speech via its speech transcription user interface) request to provide the missing semantic mapping or mappings. Examples of such requests presented to a user by the web page analyzer 106 can include—"Please point to a term on the page that indicates 'wins'"; or "Please state what term on the page indicates 'wins.'" Some additional non-limiting examples of the interactive requests presented to a user can include—"I don't understand what this "W" stands for. Can you tell me?"; or "Can you define this term for me?" At least in some embodiments, the web page analyzer 106 can also simultaneously highlight the web page element missing the semantic mapping. According to an embodiment of the present invention, the speech transcription user interface provided by the web page processing environment 100 can be configured to permit a user to respond to the presented request. Examples of user responses may include—"This (pointing at column header 'W') means wins"; "The letter "W" in the table represents wins"; "It means 'wins'" and the like. Responsive to receiving the missing semantic mapping, the web page analyzer 106 can update the domain semantic mapping knowledge base accordingly (as a third step performed at block 308).

At least in some embodiments, the web page analyzer 106 can perform web page metadata analysis to derive the semantic meaning of the ill-specified parameter. In one embodiment, the web page analyzer 106 can analyze tags in the web page that don't appear visually, but which provide hints about human-friendly terms by which the user might refer to elements in the web page. The web page analyzer 106 can automatically derive from the web page tags semantic linkages to one or more terms provided by the user. On a web page listing standings in a sports league (e.g., major league baseball), the visual representation might contain headings "W" and "L". In one embodiment, based on HTML tags found in the web page, the web page analyzer 106 can associate "W" with "Wins" and "L" with "Losses". In one embodiment, the web page analyzer 106 can keep the derived associations in a dictionary of terms. The dictionary of terms can be used by the web page analyzer 106 to and can be used to answer speech-based queries (such as "How many wins does Team X have?") in a real-time fashion, thus providing a human-like dialog experience. If there is a notion of "domain" in terms of content (such as "sports" or "football"), the dictionary of terms can be maintained by the web page analyzer 106 across different web pages that the user specifies as belonging to a particular domain.

As described above, at least in some embodiments, the web page analyzer 106 can be capable of proactive learning. If the web page analyzer 106 is unable to understand specific terms used by the user, the web page analyzer 106 can ask for assistance with associating terms on the web page with common verbalizations and thereby learn those associations. In the above example, if no HTML tags were found from which a human-friendly association for column names "W" and "L" could be derived, the web page analyzer 106 can highlight the column labeled "W" and ask the user "What does W mean?", and then extend the dictionary of terms to include the user's definition of "W" and/or "L". In an alternative embodiment, if the user asks—"How many wins does Team X have?"—and the web page analyzer 106 does not understand this term using means described above, the web page analyzer 106 may ask the user to point to the heading in the table that means "wins", capture the event label from that user event, and use this information to create a new entry in the term dictionary. In cases where web pages analyzed by the web page analyzer 106 have been purposely instrumented to support W3C standard Web Content Accessibility Guidelines or a Voluntary Product Accessibility Template, the web page analyzer 106 can take advantage of this additional tagging provided by the aforementioned standards to infer semantic mappings via heuristics, for example.

According to an embodiment of the present invention, after receiving the fully-specified command from the web page analyzer, at block 310, the command executor 108 executes the inferred command to perform the requested operation on the extracted web page data (query, sort, analyze, display or otherwise manipulate the extracted web page data). In the context of the sports web page 200 shown in FIG. 2A, examples of the executed command include, but are not limited to, "show countries/teams in the World Cup", "show rosters of countries in the World Cup", "show last year's premier league table" (command executor 108 can replace column names shown in the original website with column names taken from the "title" attribute instead, for example), "show a team's roster". With respect to the last example, if the web page 200 has multiple tables and some column names are ambiguous, the web page analyzer 106 may require clarification from a user. The web page analyzer 106 can enable the user to specify an attribute for the ambiguous column (at block 308). At block 310, the command executor 108 shows team's roster based on user's clarification. In various embodiments, the executed command can enable users to bind two or more web pages by clicking on a link and going forward a page (or more), enable users to get a value out of a table ambiguously (e.g., by asking "what is that value?"), enable retrieving a specific value out of a row by column name without hovering on that column (e.g., by asking "how many wins do they have?"), enable computing an average/maximum/minimum value of a column or combination of columns across multiple tables, enable adding 1, n, or all rows from the specified table into a new table for comparison (with the replaced human-friendly headers, for example). Examples of some other functions that could be performed by the executed command include, but are not limited to, adding rows satisfying specified conditions on their attributes into a new table for comparison (again, possibly with the replaced human-friendly headers), deleting a column from a table, sorting a table by a column (either the original web page or the newly created one), deleting a row from a table (either the original web page or the newly created one), and the like.

In one embodiment, at block 312, the command executor 108 renders the results of the executed command. In one embodiment, the command executor 108 may coordinate code injection with the code injector 102 to render the results as a modification to the original browser-executed web page script code. In another embodiment, the command executor 108 can create a new, different web page (such as web page 202) and render execution results there.

Figure 4:
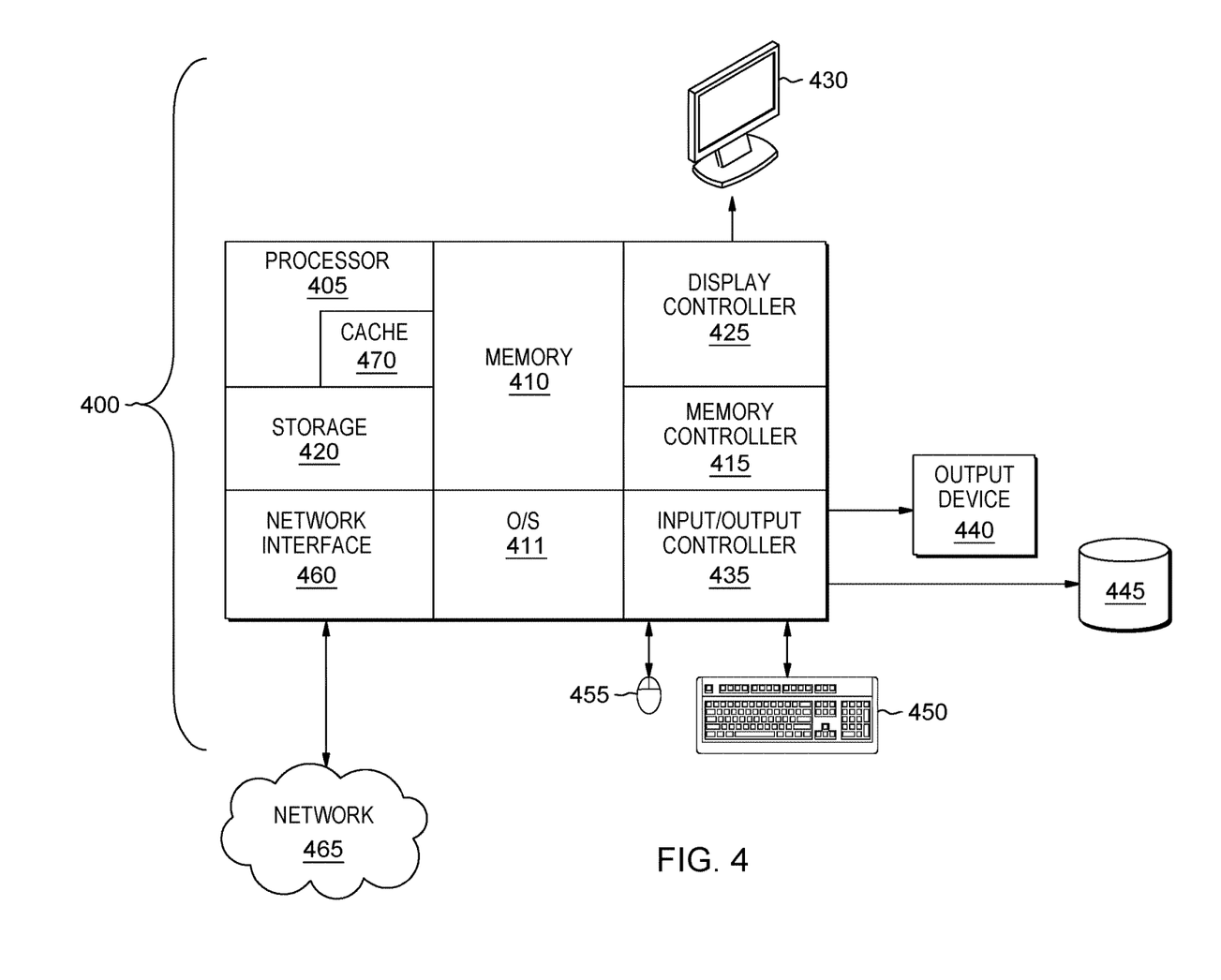
FIG. 4 is a block diagram of an example computer system for implementing some or all aspects of the method for reusing runtime execution environments, in accordance with embodiments of the present invention.

FIG. 4 is a block diagram of a computer system 400 for implementing some or all aspects of the web page processing environment 100, according to some embodiments of this invention. The web page processing environment 100 and methods described herein may be implemented in hardware, software (e.g., firmware), or a combination thereof. In some embodiments, the methods described may be implemented, at least in part, in hardware and may be part of the microprocessor of a special or general-purpose computer system 400, such as a personal computer, workstation, minicomputer, or mainframe computer. For instance, the code injector toll 101, the code executor 104, the web page analyzer 106 and the command executor 108 may each be implemented as a computer system 400 or may run on a computer system 400.

In some embodiments, as shown in FIG. 4, the computer system 400 includes a processor 405, memory 410 coupled to a memory controller 415, and one or more input devices 445 and/or output devices 440, such as peripherals, that are communicatively coupled via a local I/O controller 435. These devices 440 and 445 may include, for example, a printer, a scanner, a microphone, and the like. Input devices such as a conventional keyboard 450 and mouse 455 may be coupled to the I/O controller 435. The I/O controller 435 may be, for example, one or more buses or other wired or wireless connections, as are known in the art. The I/O controller 435 may have additional elements, which are omitted for simplicity, such as controllers, buffers (caches), drivers, repeaters, and receivers, to enable communications.

The I/O devices 440, 445 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 405 is a hardware device for executing hardware instructions or software, particularly those stored in memory 410. The processor 405 may be a custom made or commercially available processor, a central processing unit (CPU), an auxiliary processor among several processors associated with the computer system 400, a semiconductor-based microprocessor (in the form of a microchip or chip set), a macroprocessor, or other device for executing instructions. The processor 405 includes a cache 470, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 470 may be organized as a hierarchy of more cache levels (L1, L2, etc.).

The memory 410 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 410 may incorporate electronic, magnetic, optical, or other types of storage media. Note that the memory 410 may have a distributed architecture, where various components are situated remote from one another but may be accessed by the processor 405.

The instructions in memory 410 may include one or more separate programs, each of which comprises an ordered listing of executable instructions for implementing logical functions. In the example of FIG. 4, the instructions in the memory 410 include a suitable operating system (OS) 411. The operating system 411 essentially may control the execution of other computer programs and provides scheduling, input-output control, file and data management, memory management, and communication control and related services.

Additional data, including, for example, instructions for the processor 405 or other retrievable information, may be stored in storage 420, which may be a storage device such as a hard disk drive or solid-state drive. The stored instructions in memory 410 or in storage 420 may include those enabling the processor to execute one or more aspects of the clipboard manager application 102 and methods of this disclosure.

The computer system 400 may further include a display controller 425 coupled to a display 430. In some embodiments, the computer system 400 may further include a network interface 460 for coupling to a network 465. The network 465 may be an IP-based network for communication between the computer system 400 and an external server, client and the like via a broadband connection. The network 465 transmits and receives data between the computer system 400 and external systems. In some embodiments, the network 465 may be a managed IP network administered by a service provider. The network 465 may be implemented in a wireless fashion, e.g., using wireless protocols and technologies, such as WiFi, WiMax, etc. The network 465 may also be a packet-switched network such as a local area network, wide area network, metropolitan area network, the Internet, or other similar type of network environment. The network 465 may be a fixed wireless network, a wireless local area network (LAN), a wireless wide area network (WAN) a personal area network (PAN), a virtual private network (VPN), intranet or other suitable network system and may include equipment for receiving and transmitting signals.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special-purpose hardware-based systems that perform the specified functions or acts or carry out combinations of special-purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for multi-modal interaction with structured web page data, the computer-implemented method comprising:
   automatically injecting, using a processor, event monitoring code into a web page, the injected event monitoring code comprises identifiers for one or more display elements that include content to be displayed on the web page, and for one or more original executable code elements that include computer programs to operate on the content;
   receiving, using the processor, one or more event streams generated by the injected event monitoring code, an event stream comprising one or more semantic mappings between the identifiers for the one or more original executable code elements and the one or more display elements;
   receiving, using the processor, from a user, a voice command that includes a request to perform an operation to create new content using the content already displayed in the one or more display elements of the web page, the operation not being in the original executable code elements;
   generating, using the processor, a computer program having the one or more content elements as parameters and adding semantic mappings between the computer program to be executed as a command responsive to the received request;
   adding, using the processor, the command as a new executable code element of the web page; and
   executing, using the processor, the command to fulfil the received request by generating the new content that is displayed on the web page, wherein generating the new content comprises adding one or more new structured display elements to the web page, the one or more new structured display elements comprising the new content that is dynamically generated based on the content that is already displayed on the web page.

2. The computer-implemented method of claim 1, wherein the received request comprises voice input.

3. The computer-implemented method of claim 1, wherein the one or more new structured content elements comprise new columns added to a table that is already displayed on the web page.

4. The computer-implemented method of claim 1, wherein the one or more mappings comprise domain-specific semantic mappings.

5. The computer-implemented method of claim 1, wherein the injected event monitoring code is associated with specific Document Object Model (DOM) elements within the web-page.

6. The computer-implemented method of claim 5, wherein generating the command further comprises:
   determining if at least one of the one or more parameters is invalid based on the text elements included in the received request;
   retrieving one or more events extracted from the one or more event streams;
   mapping the text elements to at least one of the one or more received events associated with the DOM elements based on semantic linkages between the text elements and the DOM elements: and
   inferring a value of the at least one invalid parameter based on the mapping.

7. The computer-implemented method of claim 6, wherein inferring the value further comprises performing semantical analysis on the web page document to identify DOM elements of interest, the DOM elements of interest producing the mapping.

8. The computer-implemented method of claim 3, wherein rendering the results further comprises automatically injecting code into the web page to render a modified web page.

9. The computer-implemented method of claim 3, wherein rendering the results further comprises rendering the results using a new web page.

10. The computer-implemented method of claim 3, wherein rendering the results further comprises rendering the results using synthesized speech.

11. The computer-implemented method of claim 1, wherein the request to perform an operation on data displayed on the web page further comprises the request to perform a statistical operation over the data displayed on the web page.

12. The computer-implemented method of claim 1, wherein the one or more parameters are inferred from one or more user-supplied domain-specific semantic mappings between text elements extracted from the received request and one or more labels associated with one or more events extracted from the one or more event streams.

13. A system for multi-modal interaction with structured web page data, the system comprising:
a memory having computer-readable instructions; and
one or more processors for executing the computer-readable instructions, the computer-readable instructions comprising:
instructions for automatically injecting event monitoring code into a web page, the injected event monitoring code comprises identifiers for one or more display elements that include content to be displayed on the web page, and for one or more original executable code elements that include computer programs to operate on the content;
instructions for receiving one or more event streams generated by the injected event monitoring code, an event stream comprising one or more semantic mappings between the identifiers for the one or more original executable code elements and the one or more display elements;
instructions for receiving from a user, a voice command that includes a request to perform an operation to create new content using the content already displayed in the one or more display elements of the web page, the operation not being in the original executable code elements;
instructions for generating a computer program having the one or more content elements as parameters and adding semantic mappings between the computer program to be executed as a command responsive to the received request;
adding, using the processor, the command as a new executable code element of the web page; and
instructions for executing the command to fulfil the received request by generating new content that is displayed on the web page, wherein generating the new content comprises adding one or more new structured display elements to the web page, the one or more new structured display elements comprising the new content that is dynamically generated based on the content that was already displayed on the web page.

14. The system of claim 13, wherein the received request comprises voice input.

15. The system of claim 13, wherein the one or more new structured content elements comprise new columns added to a table that is already displayed on the web page.

16. The system of claim 13, wherein the one or more mappings comprise domain-specific semantic mappings.

17. The system of claim 13, wherein the injected event monitoring code is associated with specific Document Object Model (DOM) elements within the web-page.

18. The system of claim 17, wherein the computer-readable instructions for generating the command further comprise:
instructions for determining if at least one of the one or more parameters is invalid based on the text elements included in the received request;
instructions for retrieving one or more events extracted from the one or more event streams;
instructions for mapping the text elements to at least one of the one or more received events associated with the DOM elements based on semantic linkages between the text elements and the DOM elements: and
instructions for inferring a value of the at least one invalid parameter based on the mapping.

19. A computer-program product for multi-modal interaction with structured web page data, the computer-program product comprising a computer-readable storage memory device having program instructions embodied therewith, the program instructions executable by a processor to cause the processor to perform a method comprising:
automatically injecting event monitoring code into a web page, the injected event monitoring code comprises identifiers for one or more display elements that include content to be displayed on the web page, and for one or more original executable code elements that include computer programs to operate on the content;
receiving one or more event streams generated by the injected event monitoring code, an event stream comprising one or more semantic mappings between the identifiers for the one or more original executable code elements and the one or more display elements;
receiving from a user, a voice command that includes a request to perform an operation to create new content using the content displayed in the one or more content elements of the web page, the operation not being in the original executable code elements;
generating a computer program having the one or more content elements as parameters and adding semantic mappings between the computer program to be executed as a command responsive to the received request;
adding, using the processor, the command as a new executable code element of the web page; and
executing the command to fulfil the received request by generating the new content that is displayed on the web page, wherein generating the new content comprises adding one or more new structured display elements to the web page, the one or more new structured content elements comprising the new content that is dynamically generated based on the content that was already displayed on the web page.

20. The computer-program product of claim 19, wherein the one or more mappings comprise domain-specific semantic mappings.

* * * * *